(12) United States Patent
Hamada et al.

(10) Patent No.: US 7,989,088 B2
(45) Date of Patent: Aug. 2, 2011

(54) BARRIER LAYER FOR THICK FILM DIELECTRIC ELECTROLUMINESCENT DISPLAYS

(75) Inventors: Hiroki Hamada, Hirakata (JP); Isao Yoshida, Ibaraki (JP); Daniel J. Seale, Toronto (CA); Hui Zhang, Scarborough (CA); Yang Maizhi, North York (CA); Ye Yufeng, Toronto (CA); Li Wu, Brampton (CA); M. Smy William, Bolton (CA)

(73) Assignees: iFire IP Corporation, Oakville, Ontario (CA); Sanyo Electric Co., Ltd., Hirakata, Osaka (JP)

( * ) Notice: Subject to any disclaimer, the term of this patent is extended or adjusted under 35 U.S.C. 154(b) by 2048 days.

(21) Appl. No.: 10/736,368

(22) Filed: Dec. 15, 2003

(65) Prior Publication Data

US 2004/0170865 A1 Sep. 2, 2004

Related U.S. Application Data

(60) Provisional application No. 60/435,165, filed on Dec. 20, 2002.

(51) Int. Cl.
*H01J 1/62* (2006.01)
*B05D 5/06* (2006.01)
*G11B 11/105* (2006.01)

(52) U.S. Cl. ........ 428/690; 428/917; 313/503; 313/509; 427/66

(58) Field of Classification Search ............ 313/504, 313/506; 428/690, 917
See application file for complete search history.

(56) References Cited

U.S. PATENT DOCUMENTS

| | | |
|---|---|---|
| 5,432,015 A | 7/1995 | Wu |
| 5,476,727 A | 12/1995 | Maruta |
| 5,496,597 A | 3/1996 | Soininen |
| 5,684,309 A | 11/1997 | McIntosh |
| 5,770,920 A | 6/1998 | Eckersley et al. |
| 5,851,905 A | 12/1998 | McIntosh |
| 6,322,860 B1 | 11/2001 | Stein |
| 6,358,632 B1 | 3/2002 | Dickey |
| 6,399,222 B2 | 6/2002 | Arai et al. |
| 6,413,645 B1 | 7/2002 | Graff |
| 6,449,082 B1 | 9/2002 | Agrawal |

(Continued)

FOREIGN PATENT DOCUMENTS

GB 2286081 A 8/1995

(Continued)

OTHER PUBLICATIONS

Certified translation of JP-07-014678 Ogura et al., An electrolumescence element, Jan. 17, 1995.*

*Primary Examiner* — Angela Ortiz
*Assistant Examiner* — Camie S Thompson
(74) *Attorney, Agent, or Firm* — Fay Sharpe LLP (57) ABSTRACT

A novel sub-structure of a thick film dielectric electroluminescent display and a thick film dielectric electroluminescent display incorporating the same is provided. The sub-structure comprises a barrier layer between a substrate and a thick film dielectric layer. The barrier layer is chemically inert with respect to the substrate and the thick film dielectric layer and the barrier layer inhibits diffusion of at least one chemical species therethrough. This sub-structure results in a higher capacitance for the thick dielectric layer, which provides higher display luminance and a reduced tendency for dielectric breakdown of the thick dielectric layer. The barrier layer permits for lower cost substrates, such as glass, to be used.

44 Claims, 9 Drawing Sheets

U.S. PATENT DOCUMENTS

| | | |
|---|---|---|
| 6,492,026 B1 | 12/2002 | Graff |
| 6,589,674 B2 | 7/2003 | Li |
| 6,617,782 B2 | 9/2003 | Cheong |
| 6,819,044 B2 * | 11/2004 | Shirakawa et al. ........... 313/506 |
| 2002/0011786 A1 | 1/2002 | Murasko |
| 2002/0122895 A1 | 9/2002 | Cheong |

FOREIGN PATENT DOCUMENTS

| | | |
|---|---|---|
| JP | H05-226075 A | 9/1993 |
| JP | H06104089 | 4/1994 |
| JP | 07-014678 * | 1/1995 |
| JP | HO7-14678 A | 1/1995 |
| JP | HO7-45368 | 2/1995 |
| JP | HO7-211458 | 8/1995 |
| JP | 07014678 | 9/1998 |
| JP | H11-307262 A | 11/1999 |
| JP | 2000-68072 A | 3/2000 |
| JP | 2003-332081 | 11/2003 |
| JP | 2004-520691 | 7/2004 |
| WO | WO 00/70917 | 11/2000 |
| WO | 02058438 A2 | 7/2002 |
| WO | WO 02058438 A2 | 7/2002 |

* cited by examiner

BARRIER LAYER FOR THICK FILM DIELECTRIC ELECTROLUMINESCENT DISPLAYS

This application claims priority from U.S. Provisional application Ser. No. 60/435,165, filed on Dec. 20, 2002.

FIELD OF THE INVENTION

The present invention relates to thick film dielectric electroluminescent displays. In particular, the present invention relates to a barrier layer for a thick film dielectric electroluminescent display and to a thick film dielectric electroluminescent display incorporating the same.

BACKGROUND OF THE INVENTION

The fabrication of large area thick film dielectric electroluminescent displays, for example, for television applications, requires substrates that can be fabricated in large areas, while still maintaining their dimensional stability during the heat treatment steps of the fabrication process. In particular, lower cost substrates exhibiting such properties are preferred, in order to lower the manufacturing costs of these displays.

In thick film dielectric electroluminescent displays, a display pixel is addressed by applying a voltage between a selected address row and a selected address column on opposite sides of a phosphor layer, which is sandwiched between two dielectric layers, one of which is a thick film dielectric layer. The applied voltage creates an electric field across the phosphor film at the pixel, located at the intersection of the selected row and column site. When the voltage across the pixel exceeds a threshold voltage, electrons from the interface between the phosphor layer and an adjacent dielectric layer are injected into the phosphor layer, rendering it electrically conductive and causing the entire applied voltage across the dielectric layers.

A thick film dielectric electroluminescent display is typically constructed on a glass, glass ceramic, ceramic, other heat resistant substrate or the like. The fabrication process for the display entails first depositing a set of lower electrodes on the substrate. A thick film dielectric layer is deposited next using thick film deposition techniques that are exemplified in U.S. Pat. No. 5,432,015 (the disclosure of which is incorporated herein by reference in its entirety). A thin film structure comprised of one or more thin film dielectric layers sandwiching one or more thin phosphor films is then deposited, followed by a set of optically transparent upper electrodes using vacuum techniques as exemplified by International Patent Application WO 00/70917 (the disclosure of which is incorporated herein in its entirety). The entire resulting structure is covered with a sealing layer that protects the thick and thin film structures from degradation due to moisture or other atmospheric contaminants.

A significant advantage of electroluminescent displays with thick film dielectric layers over traditional thin film electroluminescent (TFEL) displays is that the thick film high dielectric constant layer may be made sufficiently thick to prevent dielectric breakdown without a significant increase in the display operating voltage. The high relative dielectric constant of the materials that are used minimizes the voltage drop across the dielectric layer when a pixel is illuminated. In order to prevent dielectric breakdown, the thick film dielectric layer is typically comprised of a sintered perovskite, piezoelectric or ferroelectric material e.g. lead magnesium titanate-zirconate (PMN-PT) or lead magnesium niobate (PMN), with a relative dielectric constant of several thousand and a thickness greater than about 10 micrometers. An additional thinner overlayer of a compatible piezoelectric material or ferroelectric material e.g. lead zirconate titanate (PZT), may be applied using metal organic deposition (MOD) or sol-gel techniques, to smooth the surface of the thick film for subsequent deposition of a thin film phosphor structure.

When a thick film dielectric electroluminescent display is constructed on an alumina substrate, typically, thin film gold electrodes are applied to the alumina substrate and the thick film dielectric layer is deposited thereon. The thick film dielectric layer is sintered at about 850° C. to achieve a sintered thick film density that is sufficiently high that the remaining pores, particularly in the upper portion of the layer, may be filled by deposition of the thinner overlayer deposited using sol-gel or MOD techniques. The thinner overlayer, however, does not completely fill the pores of the sintered material since it undergoes a severe volume reduction when the sol-gel or MOD precursor materials are fired to form the piezoelectric or ferroelectric material of the thinner overlayer. To overcome this disadvantage, an isostatic pressing process is used to deposit the thick film dielectric layer and mechanically compress it before it is sintered as described in U.S. patent application Ser. No. 09/540,288 filed Mar. 31, 2000 (the entirety of which is incorporated herein by reference). This serves the function of increasing the density and decreasing the porosity of the thick film dielectric layer so that, when the thinner overlayer is applied, both the relative dielectric constant and the dielectric strength of the thick film dielectric layer is increased. Since the dielectric breakdown is associated with random defects in the dielectric layers, the probability of breakdown increases with increasing display area, and so layers with a higher nominal dielectric strength are used for larger area displays to counteract this tendency.

When a thick film dielectric electroluminescent display is constructed on glass substrates, the thick film dielectric layer is sintered at temperatures preferably close to the softening point of the glass, but not to the point where the glass deforms during display processing. Typically this temperature is near 700° C. Near this temperature, however, atomic species in the glass substrate, particularly those elements of Group IA of the Periodic Table, become mobile and may diffuse into the display structure, where they may cause functional degradation.

Constituent materials of the thick film dielectric layer, such as lead magnesium niobate (PMN) and lead magnesium titanate-zirconate (PMN-PT) are all high dielectric constant ferroelectric or para-electric materials by virtue of their perovskite crystal structure. PMN, however, may also form a pyrochlore crystal structure that is not ferroelectric and has a low relative dielectric constant. The formation of the pyrochlore phase has been reported to be suppressed by the addition of lead titanate to PMN in the thick film paste to form, upon sintering, PMN-PT, but the relative dielectric constant of this material will be too low for adequate display performance if the lead titanate concentration is too high. The tendency for pyrochlore formation may also be increased by the introduction of atomic species from the glass substrates.

It is apparent, therefore, that there is a need for a thick film dielectric electroluminescent display that obviates and mitigates some of the disadvantages previously discussed.

SUMMARY OF THE INVENTION

The invention is a barrier layer for use within a thick film dielectric electroluminescent display. The barrier layer inhibits diffusion of at least one chemical species through the display.

In another aspect of the invention, there is provided a barrier layer for a thick film dielectric electroluminescent display. The barrier layer is chemically inert with respect to its adjacent layers and the barrier layer minimizes and may inhibit diffusion, and thus reaction, of at least one chemical species from the substrate into the rest of the display and/or from the rest of the display into the substrate.

In yet another aspect of the invention, there is provided a barrier layer for a thick film dielectric electroluminescent display that inhibits at least one chemical species in a thick film dielectric layer from reacting with at least one chemical species of the substrate.

In another aspect of the present invention, there is provided a barrier layer for a thick film dielectric electroluminescent display that inhibits a reaction between at least one chemical species in a thick film dielectric layer with at least one chemical species from a glass substrate, by inhibiting diffusion of the at least one chemical species from the thick film dielectric layer into the glass substrate and vice-versa. This results in a higher capacitance for the thick dielectric layer, which provides higher display luminance and a reduced tendency for cracking of the thick dielectric layer.

According to an aspect of the present invention is a sub-structure of a thick film dielectric electroluminescent display, the sub-structure comprising:
 a substrate;
 a barrier layer on said substrate;
 a lower electrode provided on said barrier layer; and
 a thick film dielectric layer provided on said lower electrode.

In other embodiments, the sub-structure may have the barrier layer present on the lower electrode. In still other embodiments, the barrier layer may be present both on the substrate and on the lower electrode within the thick film dielectric electroluminescent display.

In yet another aspect of the present invention, there is provided a sub-structure of a thick film dielectric electroluminescent display, the sub-structure comprising, in sequence:
 a substrate;
 a barrier layer;
 a lower electrode; and
 a thick film dielectric layer,
  the barrier layer being chemically inert with respect to the substrate and the lower electrode, the barrier layer inhibiting diffusion of at least one chemical species therethrough.

In another aspect of the present invention, the barrier layer is adjacent both the substrate and the lower electrode layer.

In another aspect of the present invention, the barrier layer has physical properties such that internal stress is minimized during fabrication of the sub-structure and the barrier layer and other layers of the sub-structure and display remain substantially crack-free.

In another aspect of the present invention, the barrier layer has a thermal expansion coefficient that matches the thermal expansion coefficients of the other layers to minimize internal stress.

In yet another aspect of the present invention, the barrier layer has a thermal expansion coefficient of about $4 \times 10^{-6}/°C$. to about $10 \times 10^{-6}/°C$.

In another aspect of the present invention, the barrier layer comprises a material selected from the group consisting of alumina, aluminum nitride, aluminum fluoride and barium titanate.

In another aspect of the present invention, the barrier layer has a thickness of at least about 50 nanometers, preferably a thickness of at least about 100 nanometers.

In a further aspect of the present invention, the thick film dielectric layer has a relative dielectric constant greater than about 50. Typically, the thick film dielectric layer has a relative dielectric constant of at least about 1000.

In another aspect of the present invention, the thick film dielectric layer is a composite thick film dielectric layer.

In yet another aspect of the present invention, the sub-structure further comprises, in sequence, a smoothing layer adjacent the thick film dielectric layer.

In another aspect of the present invention, the at least one chemical species is selected from the group consisting of alkali metals and alkaline earth metals.

In another aspect of the present invention, a variety of substrates may be used, as will be understood by persons skilled in the art. The preferred substrate for use with the barrier layer of the present invention is a glass substrate that comprises elements selected from the group consisting of Group IA (alkali metals), Group IIA (alkaline earth metals), silicon and aluminum. Other examples of substrates include, but are not limited to, ceramics such as alumina, metal ceramic composites, glass materials, glass ceramic materials, other heat resistant materials and the like.

In yet another aspect of the present invention, an other barrier layer is interposed between the lower electrode and the thick film dielectric layer and the other barrier layer is chemically inert with respect to the lower electrode and the thick film dielectric layer and inhibits diffusion of at least one chemical species therethrough. Preferably, the other barrier layer is selected from the group consisting of a layer of a material having a relative dielectric constant greater than about 50 and a layer of a material having a lower relative dielectric constant and a thickness of up to about 50 nm. More preferably, the other barrier layer comprises crystalline barium titanate or the other barrier layer has a thickness of up to about 50 nm (in some aspects, about 20 nm to about 50 nm) and comprises a material selected from the group consisting of alumina, aluminum nitride, aluminum fluoride and barium titanate.

In another aspect of the present invention, there is provided a sub-structure of a thick film dielectric electroluminescent display, the sub-structure comprising, in sequence:
 a substrate;
 a lower electrode;
 a barrier layer; and
 a thick film dielectric layer,
  the barrier layer being chemically inert with respect to the lower electrode and the thick film dielectric layer, the barrier layer inhibiting diffusion of at least one chemical species therethrough. Preferably, the other barrier layer is selected from the group consisting of a layer of a material having a relative dielectric constant greater than about 50 and a layer of material having a lower relative dielectric constant and a thickness of up to about 50 nm. More preferably, the other barrier layer comprises crystalline barium titanate or the other barrier layer has a thickness of up to about 50 nm, in some aspects, about 20 nm to about 50 nm and comprises a material selected from the group consisting of alumina, aluminum nitride, aluminum fluoride and barium titanate.

In another aspect of the present invention, the thick film dielectric layer is a composite thick film dielectric layer.

In a further aspect of the present invention, there is provided a thick film dielectric electroluminescent display comprising the sub-structure discussed above.

In another aspect of the present invention, there is provided a method for making a sub-structure for use in a thick film dielectric electroluminescent display, the method comprising;
  i) depositing a barrier layer onto a substrate;
  ii) depositing a lower electrode onto the barrier layer; and
  iii) depositing a thick film dielectric layer onto the lower electrode, the barrier layer being chemically inert with respect to the substrate and the lower electrode, the barrier layer inhibiting diffusion of at least one chemical species therethrough. The barrier layer is deposited using methods well known to those skilled in the art in order to provide a dense and continuous layer.

In yet another aspect of the present invention, there is provided a method for making a sub-structure for use in a thick film dielectric electroluminescent display, the method comprising;
  i) depositing a lower electrode onto a substrate;
  ii) depositing a barrier layer onto the lower electrode; and
  iii) depositing a thick film dielectric layer onto the lower electrode,
  the barrier layer being chemically inert with respect to the lower electrode and the thick film dielectric layer, the barrier layer inhibiting diffusion of at least one chemical species therethrough. Preferably, the other barrier layer is selected from the group consisting of a layer of a material having a relative dielectric constant greater than about 50 and a layer of material having a lower relative dielectric constant and a thickness of up to about 50 nm. More preferably, the other barrier layer comprises crystalline barium titanate or the other barrier layer has a thickness of up to about 50 nm (in some aspects, about 20 nm to about 50 nm) and comprises a material selected from the group consisting of alumina, aluminum nitride, aluminum fluoride and barium titanate.

In another aspect of the present invention, the barrier layer of the method has physical properties such that internal stress is minimized during fabrication of the sub-structure and the barrier layer and other layers of the sub-structure and display remain substantially crack-free.

In another aspect of the present invention, the thick film dielectric layer of the method is a composite thick film dielectric layer.

In a further aspect of the present invention, there is provided a sub-structure of a thick film dielectric electroluminescent display, the sub-structure comprising a barrier layer between a substrate and a thick film dielectric layer, the barrier layer being chemically inert with respect to the substrate and the thick film dielectric layer, the barrier layer inhibiting diffusion of at least one chemical species therethrough. Preferably, the barrier layer has physical properties such that internal stress is minimized during fabrication of the sub-structure and the barrier layer and other layers of the sub-structure and display remain substantially crack-free. Preferably, the thick film dielectric layer is a composite thick film dielectric layer.

In a further aspect of the present invention, there is provided a sub-structure of a thick film dielectric electroluminescent display, the sub-structure comprising, in sequence:
  a substrate;
  a barrier layer inhibiting diffusion of at least one chemical species therethrough;
  a lower electrode; and
  a composite thick film dielectric layer,
  the barrier layer being chemically inert with respect to the substrate and the lower electrode, the barrier layer having physical properties such that internal stress is minimized during fabrication of the sub-structure and the barrier layer and other layers of the sub-structure and display remain substantially crack-free.

Other features and advantages of the present invention will become apparent from the following detailed description. It should be understood, however, that the detailed description and the specific examples while indicating embodiments of the invention are given by way of illustration only, since various changes and modifications within the spirit and scope of the invention will become apparent to those skilled in the art from said detailed description.

BRIEF DESCRIPTION OF THE DRAWINGS

The present invention will become more fully understood from the detailed description given herein and from the accompanying drawings, which are given by way of illustration only and do not limit the intended scope of the invention.

DETAILED DESCRIPTION OF THE PREFERRED EMBODIMENTS

The present invention provides a novel a sub-structure within a thick film dielectric electroluminescent display. The sub-structure comprises a barrier layer between a substrate and a thick film dielectric layer. The barrier layer is chemically inert with respect to the substrate and the thick film dielectric layer and the barrier layer minimizes and/or inhibits diffusion of at least one chemical species therethrough. In this manner, chemical species are essentially not diffused from one area of the display to another to have any potentially deleterious effects.

The barrier layer also minimizes any increase in the electrical resistance of the row electrodes when such electrodes are gold. Such an increase in resistance is not desirable and may occur during heat treatment of the thick film dielectric layer and other layers of the display. The barrier layer also helps to prevent cracking of the PZT smoothing layer provided on the sintered thick film dielectric layer. Generally, the PZT layer covers a greater portion of the substrate area than the thick film dielectric and thus when ITO column electrodes are deposited and patterned on top of the entire display, the ITO column electrodes outside of the active display area must be deposited over top of the PZT layer where it lies directly on top of the bare or coated glass substrate to connect with the column drivers. If the PZT layer in this area is cracked, then the column electrodes too will be cracked and electrically discontinuous, which is not desirable. The PZT layer may crack where it directly overlies the glass substrate if the glass is not coated with the barrier layer of the invention. Thus the barrier layer prevents cracking of the PZT layer when the substrate is coated with it.

Figure 1:
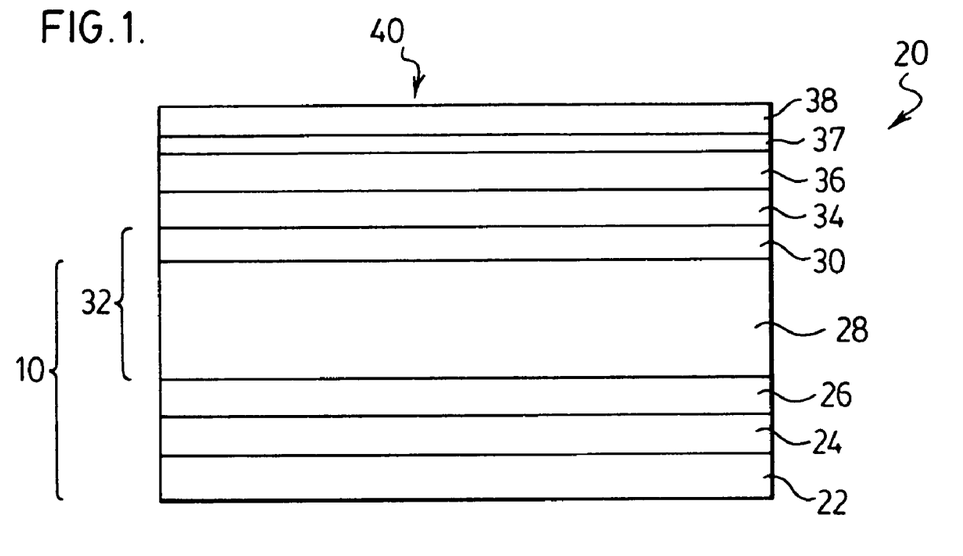
FIG. 1 shows a sectional view of a thick film dielectric electroluminescent display of a first embodiment of the present invention, showing the position of a barrier layer.

Reference is first made to FIG. 1 to describe a first embodiment of a sub-structure 10 of a thick film dielectric electroluminescent display 20. The sub-structure 10 comprises, in sequence, a substrate 22, a barrier layer 24, a lower electrode 26 and a thick film dielectric layer 28. The barrier layer 24 is chemically inert with respect to the substrate 22 and the lower electrode 26 and the barrier layer 24 inhibits diffusion of chemical species therethrough.

The thick film dielectric electroluminescent display 20 will now be described in more detail. As shown in FIG. 1, the substrate 22 is a glass substrate comprising at least one chemical species selected from the group consisting of silica, alumina, alkali metal oxides, alkaline earth oxides and mixtures thereof. The substrate 22 has the barrier layer 24 deposited thereon. The barrier layer 24 comprises a material selected from the group consisting of alumina, aluminum nitride, aluminum fluoride, and barium titanate. The lower electrode 26 is a gold electrode, which is deposited on the barrier layer 24. The thick film dielectric layer 28 is lead magnesium niobate (PMN), which is deposited on the lower electrode 26. A smoothing layer 30 is deposited on the thick film dielectric layer 28. The smoothing layer 30 comprises lead zirconate titanate (PZT). Combination of the thick film dielectric layer 28 and the smoothing layer 30 is referred to as a composite thick film dielectric layer 32. A thin film dielectric layer 34 is deposited on the smoothing layer 30. The thin film dielectric layer 34 is barium titanate. A phosphor layer 36 is then deposited on the thin film dielectric layer 34, followed by the deposition of an upper dielectric layer 37 and then an upper electrode 38. The phosphor layer 36 is terbium activated zinc sulfide phosphor layer, the upper dielectric layer 37 is aluminum nitride and the upper electrode 38 is indium tin oxide (ITO). The display 20 is covered with a sealing layer (not shown) to protect the display 20 from degradation due to moisture and/or other atmospheric contaminants. The substrate 22 is opposite to a viewing side 40 of the display 20.

The barrier layer 24 helps to inhibit diffusion of chemical species from the substrate to the thick film dielectric layer 28, and other elements of the display, and inhibits the diffusion of chemical species from the thick film dielectric layer 28 to the substrate 22. Diffusion of chemical species from the thick film dielectric layer 28 into the substrate 22 may lower the softening temperature of the substrate 22, resulting in deformation of the substrate 22 during fabrication of the display 20 and cause increased diffusion of chemical species from the substrate 22 itself.

Figure 2:
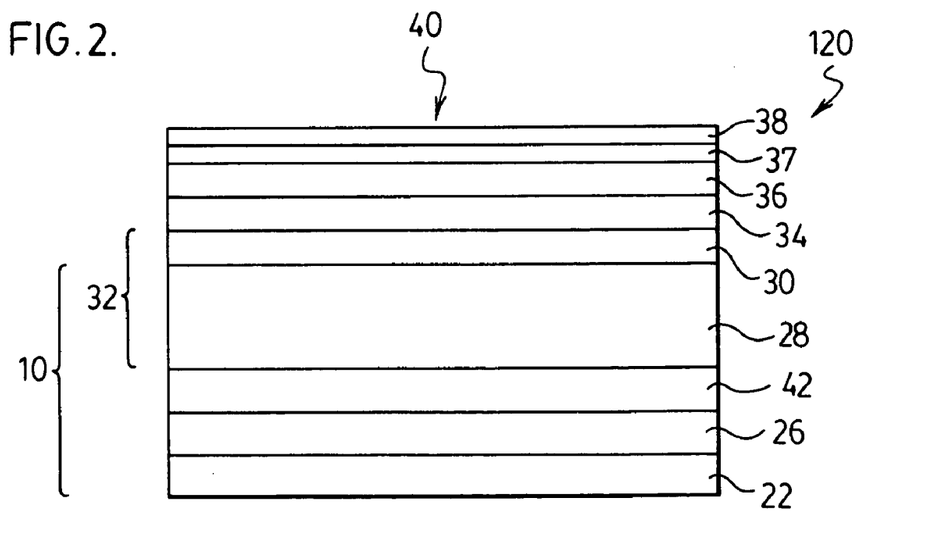
FIG. 2 shows a sectional view of a thick film dielectric electroluminescent display of a second embodiment of the present invention, showing the position of a barrier layer.

Reference is now made to FIG. 2 to describe a second embodiment of a sub-structure 100 of a thick film dielectric electroluminescent display 120. The sub-structure 100 comprises, in sequence, the substrate 22, the lower electrode 26, a barrier layer 42 and the thick film dielectric layer 28. The barrier layer 50 is chemically inert with respect to the lower electrode 26 and the thick film dielectric layer 28 and the barrier layer 42 inhibits diffusion of chemical species therethrough. This particular embodiment is useful if the lower electrode 26 is not susceptible to degradation from diffusion of chemical species from the substrate 22. The elements, other than the barrier layer 42 of this embodiment, are understood to be the same as those described in the previous embodiment.

The thick film dielectric electroluminescent display 120 will now be described in more detail. As shown in FIG. 2, the substrate 22 has the lower electrode 26 deposited thereon. The barrier layer 42 is deposited on the lower electrode 26. The barrier layer 42 inhibits diffusion of chemical species from the substrate to the thick film dielectric layer 28, and other elements of the display, and inhibits the diffusion of chemical species from the thick film dielectric layer 28 to the substrate 22. The barrier layer 42 has a relatively high dielectric constant and comprises crystalline barium titanate. If the barrier layer 42 of this embodiment had a lower relative dielectric constant, the performance of the display may be degraded since the barrier layer 42 may lower the capacitance of the thick film dielectric layer 28. Consequently, a lower capacitance has the effect of reducing the display 20 luminance at a fixed operating voltage.

The thick film dielectric layer 28 is then deposited on the barrier layer 42, followed by deposition of the smoothing layer 30 thereon. The thin film dielectric layer 34 is then deposited on the smoothing layer 30, followed by sequential deposition of the phosphor layer 36, an upper dielectric layer 37 and then the upper electrode 38. The display 120 is covered with a sealing layer (not shown) to protect the display 120 from degradation due to moisture and/or other atmospheric contaminants. The substrate 22 is opposite to a viewing side 40 of the display 120.

In another embodiment, the barrier layer 42 comprises a material selected from the group consisting of alumina, aluminum nitride, aluminum fluoride and barium titanate. The barrier layer 42 has a thickness of up to about 50 nm, such that the display 20 luminance is not substantially affected.

The second embodiment of FIG. 2 may also have an other barrier layer similar to the barrier layer 24 interposed between the substrate 22 and the lower electrode 26. The other barrier layer is chemically inert with respect to the substrate 22 and the lower electrode 26 and the other barrier layer inhibits diffusion of chemical species therethrough.

In another embodiment, which is similar to the first embodiment, the substrate 22 is a glass substrate, which comprises a mixture of chemical species. The mixture of chemical species comprises about 55% to 93% (inclusively) by weight silica; about 7% to 45% (inclusively) by weight alumina; alkali metal oxides; and alkaline earth oxides. The barrier layer 24 comprises a material selected from the group consisting of alumina, aluminum nitride and aluminum fluoride.

In a further embodiment, the substrate 22 is sintered alumina and the barrier layer 24 is sputtered alumina. The barrier layer 24 is chemically inert with respect to the substrate 22 and the lower electrode 26 and, surprisingly, the barrier layer inhibits diffusion of aluminum from the substrate into the thick film dielectric layer.

In general, with respect to the embodiments described above, the barrier layer is chemically inert with respect to its adjacent layers and the barrier layer inhibits diffusion of at least one chemical species therethrough; both diffusion of at least one chemical species from the substrate into the display and at least one chemical species from the display into the substrate. Without being limited by theory, it is thought that the barrier layer inhibits the chemical species in the thick film dielectric layer from reacting with the chemical species of the substrate.

The chemical species inhibited may be any chemical species detrimental to the display's operability. Preferably, the chemical species inhibited include elements from Groups IA (alkali metals) and IIA (alkaline earth metals) of the Periodic Table, aluminum and silicon. Preferably, the barrier layer adheres to the adjacent layers and has physical properties to ensure that it does not substantially crack during the fabrication of the thick film dielectric electroluminescent display or cause substantial cracking of the layers in the display itself. Cracking may be avoided by minimizing internal stress within the display. This may be done by appropriately matching the thermal expansion coefficients of the different layers within the display to minimize internal stress as a result of temperature changes during the firing steps of display fabrication. The thermal expansion coefficient of the barrier layer is preferably in the range of about $4 \times 10^{-6}/°$ C. to about $10 \times 10^{-6}/°$ C., inclusively, and more preferably in the range of about $5.5 \times 10^{-6}/°$ C. to about $9 \times 10^{-6}/°$ C., inclusively. (The barrier layer may crack if its thermal coefficient of expansion is not well matched to that of the substrate.)

The barrier layer may be deposited using various methods well known to those skilled in the art in order to provide a dense and continuous layer. The barrier layer may comprise a material selected from the group consisting of alumina, aluminum nitride, aluminum fluoride, and barium titanate.

If the barrier layer is between the substrate and the lower electrode, preferable thicknesses of the barrier layer are at least about 50 nm and, more preferably, at least about 100 nm. This includes any ranges or subranges from 50 nm to over 100 nm.

If the barrier layer is between the lower electrode and the thick dielectric layer, the barrier layer may be selected from the group consisting of a layer of a material having a relative dielectric constant greater than about 50 and a layer of material having a lower relative dielectric constant and a thickness of up to about 50 nm. More preferably, the other barrier layer comprises crystalline barium titanate or the other barrier layer has a thickness of at most about 50 nm (more preferably, about 20 nm to about 50 nm) and comprises a material selected from the group consisting of alumina, aluminum nitride, aluminum fluoride and barium titanate.

The barrier layer may also comprise more than one barrier layer. For instance, several barrier layers may be stacked on top of one another, with each barrier layer selective for a particular chemical species.

With respect to the substrate, a variety of substrates may be used, as will be understood by persons skilled in the art. The typical substrate used with the barrier layer of the present invention is a glass substrate that comprises elements selected from the group consisting of Group IA (alkali metals), Group IIA (alkaline earth metals), silicon and aluminum. Other examples of substrates include, but are not limited to, ceramics such as alumina, metal ceramic composites, glass materials, glass ceramic materials, other heat resistant materials and the like.

The lower electrode may be any suitable electrically conductive film known to those skilled in the art. Preferably, the lower electrode comprises gold or a silver alloy.

The thick dielectric layer is designed to provide high resistance against dielectric breakdown when the display is operated at the voltage required to produce the display luminance. Typically, the thick dielectric film layer comprises a sintered perovskite, piezoelectric or ferroelectric material such as lead magnesium niobate (PMN) or lead magnesium niobate-titanate (PMN-PT) with a relative dielectric constant of greater than about 50, but several thousand is typical and a thickness greater than about 10 micrometers to prevent dielectric breakdown.

Preferably, with low cost glass material substrates, the composition of a thick film paste used to form the thick film dielectric layer of the thick film dielectric electroluminescent display is that described in Applicant's co-pending U.S. Patent Application No. 60/341,790 filed Dec. 21, 2001, (the entirety of which is incorporated herein by reference). The thick film paste comprises one or more perovskite-forming precursor powders selected from the group consisting of lead magnesium niobate (PMN), lead magnesium niobate-titanate (PMN-PT), lead titanate, and barium titanate and mixtures thereof and, optionally, lead oxide to compensate for lead oxide evaporated from the powder during subsequent sintering or heat treatment steps. The thick film paste may also include a glass frit composition that comprises lead oxide, boron oxide and silicon oxide and has a melting temperature below about 550° C. To achieve deposition of the thick film dielectric layer of required thickness and uniformity, a deposition method selected from the group consisting of screen-printing, spraying, and roll coating is used. A vehicle comprising a solvent, a polymer binder to hold the deposited thick film dielectric layer together prior to sintering, and, optionally, viscosity and surface tension modifying agents are used during the deposition method.

Different proportions of the constituent precursor materials of the thick film paste may be used. The major phase may be PMN or PMT-PT and may be present between about 85% by weight and about 95% by weight of the total weight of precursor materials. Preferably, the composition of thick film pastes used to fabricate the thick film dielectric electroluminescent displays comprises PMN and lead titanate powder to provide a sintered material with the nominal formula Pb $(Mg_{0.33} Nb_{0.667})_{1-x}Ti_xO_3$, where $0 < x < 0.15$ and more preferably, $0 < x < 0.10$. Barium titanate may also be added in sufficient concentration to provide a sintered material with the nominal formula (Pb $(Mg_{0.33} Nb_{0.667})_{1-x}Ti_xO_3)_{1-y}(BaTiO_3)_y$, where $0 < x < 0.15$ and $0 < y < 0.10$ and, more preferably, $0.01 < x < 0.10$ and $0.01 < y < 0.1$.

The smoothing layer preferably includes several thin layers deposited on the thick film dielectric layer using sol gel or metal organic deposition (MOD) techniques as described in Applicant's co-pending U.S. Patent Application No. 60/341,790 filed Dec. 21, 2001 (the contents of which are incorporated herein by reference). The sol gel or MOD thin layers can be formulated to provide a lead zirconate titanate (PZT) smoothing layer as described in Patent Application PCT/CA00/00561 (the contents of which are incorporated herein by reference) and/or a barium titanate layer as described in Applicant's co-pending U.S. patent application Ser. No. 09/761,971 filed on Jan. 17, 2001 (the contents of which are incorporated herein by reference). Briefly, the smoothing layer is provided as a precursor smoothing solution containing PZT. Upon sintering at suitable temperatures, the smoothing solution reacts with the thick layer composition to help fill any pores and/or voids and forms the intermediate zone and the PZT upper layer. The behaviour of the MOD solution used to deposit the MOD layer is significantly different for glass material substrates than it is for the alumina substrates described in the prior art. These differences are in part due to the different thick film dielectric firing temperatures used for the different substrate materials The optimum MOD solution viscosity is different for different substrate materials.

The phosphor layer may include any suitable red, green and blue phosphor materials. These phosphor materials may include europium activated barium thioaluminate based materials for blue emission, terbium activated zinc sulfide, manganese activated magnesium zinc sulfide or europium activated calcium thioaluminate based materials for green emission, as well as traditional manganese activated zinc sulfide that can be appropriately filtered for red emission.

The thin dielectric layers and upper dielectric layers used herein may include barium titanate, alumina, aluminum nitride, silicon oxynitride, barium tantalate, tantalum oxide and the like.

Further examples of suitable substrates, lower electrodes, thick dielectric layers and phosphor layers for use in the present invention are described in Applicant's U.S. Pat. No. 5,432,015 and Applicant's co-pending U.S. Patent Application No. 60/341,790 filed Dec. 21, 2001, (the contents of both are incorporated herein by reference).

The upper electrode is a transparent electrically conductive layer, typically, an oxide such as indium tin oxide (ITO) or doped zinc oxide.

In summary, the invention provides a barrier layer that helps to minimize diffusion of chemical species from the substrate and/or thick film dielectric layer into the rest of the display or alternatively, from the rest of the display into the thick film dielectric layer or substrate. Furthermore, the barrier layer minimizes an increase in the electrical resistance of the row electrodes provided on the substrate. In particular this occurs when the row electrodes are gold. Such an increase in electrical resistance is not desirable. This effect may occur when the thick dielectric layer and other layers of the electroluminescent display are heated. Lastly, the barrier layer of the present invention helps to minimize and/or prevent cracking of the PZT smoothing layer that is provided on the sintered thick film dielectric layer.

The above disclosure generally describes preferred embodiments of the present invention. A more complete understanding can be obtained by reference to the following specific Examples. These Examples are described solely for purposes of illustration and are not intended to limit the scope of the invention. Changes in form and substitution of equivalents are contemplated as circumstances may suggest or render expedient. Although specific terms have been employed herein, such terms are intended in a descriptive sense and not for purposes of limitation.

EXAMPLES

Example 1

A thick film dielectric electroluminescent display of the type generally shown in FIG. 1 was fabricated.

The thick film dielectric electroluminescent display was constructed on a 5 centimeter by 5 centimeter by 1.8 millimeter thick PD200 glass substrate obtained from Asahi Glass of Hillsboro, Oreg., USA onto which was deposited a 2000 Angstrom thick barrier layer of alumina ($Al_2O_3$). The alumina was deposited using rf magnetron sputtering in an oxygen/argon mixture at a pressure of 6 millitorr (0.8 Pa). The oxygen to argon ratio was set by admitting argon to the sputtering chamber at a rate of 50 sccm and oxygen at a rate of 2 sccm, with the pumping rate set to maintain the noted pressure. The power supplied to the sputtering target was 2 kW (or 4.4 Watts per square centimeter).

A 0.8 micrometer thick gold electrode film was formed on the coated substrate by printing and firing TR1207 gold-containing paste from Tanaka Kikinzoku International of Tokyo, Japan. Next, a composite thick film dielectric layer was fabricated on the gold lower electrode using the general methods described in Applicant's co-pending U.S. Patent Application No. 60/341,790 filed Dec. 21, 2001, which is incorporated herein by reference, but with the specific process modifications described below. A barium titanate layer was deposited on the thick dielectric layer, as described in co-pending U.S. patent application Ser. No. 09/761,971 filed Jan. 17, 2001 and a 0.7 micron thick terbium activated zinc sulfide phosphor layer deposited according to the methods of U.S. Patent Application No. 60/406,661 filed Aug. 29, 2002, incorporated herein by reference. A 500 Å thick silicon nitride ($Si_3N_4$) layer was deposited on the phosphor layer using the methods of U.S. Patent Application No. 60/409,991 filed Sep. 12, 2002. To complete the display, an upper electrode comprising indium tin oxide was deposited on the silicon nitride layer and the display was sealed to protect it from the ambient environment.

The composite thick film dielectric layer was formed on the alumina coated glass using the following process. A thick film paste for this structure was prepared using a mixture of PMN powders, one with a particle size distribution having a d50 of 0.45 micrometers and a d90 of 0.63 and the other with a particle size distribution having a d50 of 0.36 micrometers and a d90 of 0.63. Each powder was prepared by grinding in a planetary ball mill for 2 hours and 16 hours, respectively. The powders were then mixed in a weight ratio of 1.14:1 and used to formulate the thick film paste. A first thick film dielectric layer having a thickness of about 5 micrometers was printed on the substrate, densified by compression and fired in the range of about 700° C. to about 720° C. for about 18 minutes.

The second step in forming the composite thick film dielectric layer was to deposit and fire, at about 700° C. for about 7 minutes, a first layer of PZT, which was about 0.5 micrometer thick. This deposition was done using the MOD process described in U.S. patent application Ser. No. 09/540,288 filed Mar. 31, 2000, incorporated herein by reference, with the MOD solution adjusted to have a viscosity in the range of about 9 to about 15 centipoise.

The third step in forming the composite thick film dielectric layer was to deposit, densify and fire a second thick film dielectric layer of PMN, also of a thickness of about 5 micrometers. The fourth step was to form a second layer of PZT, about 1.6 micrometer thick, using the same process as for the second step. The fifth step was to complete the composite dielectric layer by applying a third layer of PZT, about 0.5 micrometers thick, using the same process that was used to increase the thickness of the topmost PZT layer to about 1 micrometer. During the repeated firings, intermixing and inter-diffusion of the PMN and PZT layers occurred. It was observed that the completed display was free of cracks when examined under a microscope.

The completed thick film dielectric electroluminescent display was tested using alternating polarity 30 nanosecond pulses with a voltage amplitude of 60 volts above the threshold voltage of 154 volts measured for the display. The luminance was about 2700 candelas per square meter with a high degree of uniformity.

Example 2

A thick film dielectric electroluminescent display similar to Example 1 was fabricated, except that no alumina barrier layer was deposited on the glass substrate. The completed display was tested using the test procedure defined in Example 1. The luminance was about 2200 candelas per square meter, which is lower than that for Example 1. It is thought that the lower luminance is due to a lower effective relative dielectric constant of the composite thick film dielectric layer due to diffusion of chemical species from the glass substrate to the composite thick film dielectric layer.

Example 3

A thick film dielectric electroluminescent display similar to Example 1 was fabricated, except that it was fabricated on a 16.9 centimeter by 21.3 centimeter glass substrate. The lower electrode was patterned using photolithographic processing into 0.8 micrometer thick address line strips 495 microns wide separated by 45 micron spaces and the upper electrode was patterned into strips 5 millimeters wide separated by 5 millimeter spaces. The display was tested by connecting the lower address line strips in parallel, and one of the upper electrode strips and then using the test method of Examples 1. The luminance was about 2550 candelas per square meter.

Example 4

A thick film dielectric electroluminescent display similar to Example 3 was fabricated, except that no alumina barrier layer was deposited on the glass substrate. The completed display was tested using the test procedure defined in Example 1. The luminance was about 1850 candelas per square meter. The reduction of the luminance for this display (with the patterned lower electrodes and without the alumina barrier layer) compared to the luminance of the corresponding display of Example 3 (with the patterned lower electrodes and with the alumina barrier layer) was substantially greater than the reduction of the luminance for the display of Example 2 (with an unpatterned lower electrode and without the alumina barrier layer) compared to the luminance of the corresponding display of Example 1 (with an unpatterned lower electrode and with the alumina barrier layer). In theory, this is believed to be due to more rapid diffusion of chemical species from the glass substrate to the composite thick film dielectric layer since the glass substrate is in direct contact with the composite thick film dielectric layer between the lower electrodes when an alumina barrier layer is not present. The gold of the lower electrodes appear to have some effect on reducing diffusion of chemical species from the glass substrate, but does not reduce the diffusion to the desired extent.

Example 5

Two thick film dielectric electroluminescent displays similar to those of Examples 3 and 4 were fabricated, except that the lower electrodes (gold electrodes) were directly patterned by screen printing and firing TR145C gold-containing paste, supplied by Tanaka Kikinzoku International of Tokyo, Japan, onto the substrate. For these displays, the gold electrodes were about 0.9 micrometers thick in the centre of the address line strips but thinner towards the edges of the strips. The thinner gold at the edges of the strips provided less of a barrier to diffusion of chemical species from the glass substrate, which resulted in non-uniform brightness and a non-uniform threshold voltage across the strips. This non-uniform threshold voltage for the display without the alumina barrier layer also caused a lower brightness for the display. The gold electrodes of this example provides less of a barrier to diffusion of chemical species from the glass substrate compared to the gold electrodes of Examples 3 and 4 and, as a result, there was a marked difference between the luminance of 1400 candelas per square meter for the display with the alumina barrier layer (compared to 2550 candelas per square meter for Example 3) and the luminance of 700 candelas per square meter for the display without the alumina diffusion barrier (compared to 1850 candelas per square meter for Example 4).

The following examples illustrate directly the effect of different barrier layers between the glass and the thick dielectric layer at different process temperatures Example 6

Figure 3A:
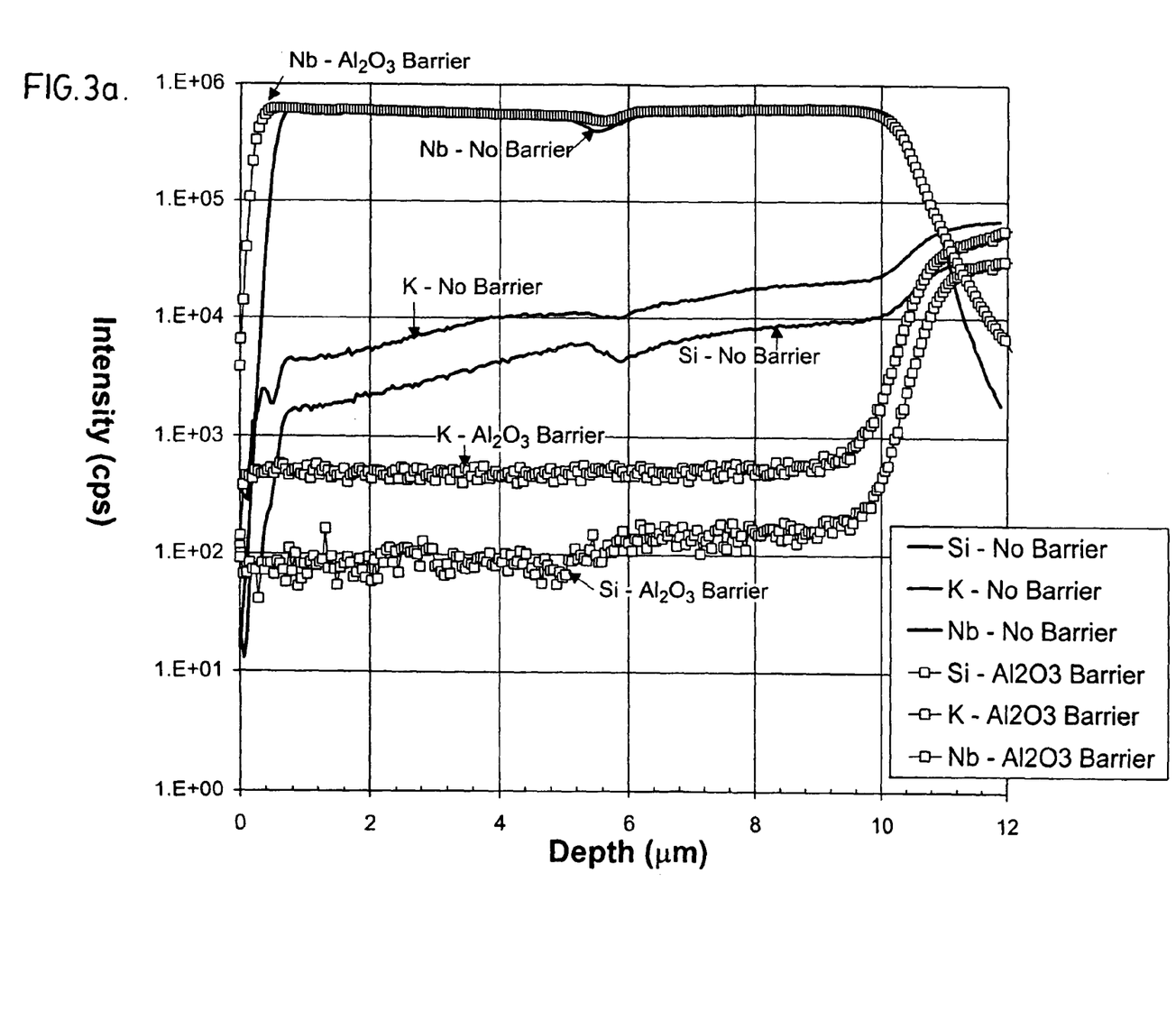
FIG. 3a is a graph showing a concentration of chemical species (Nb, Si, K) versus depth in a composite thick film dielectric structure for thick film dielectric electroluminescent displays with and without an alumina barrier layer of the present invention.
Figure 3B:
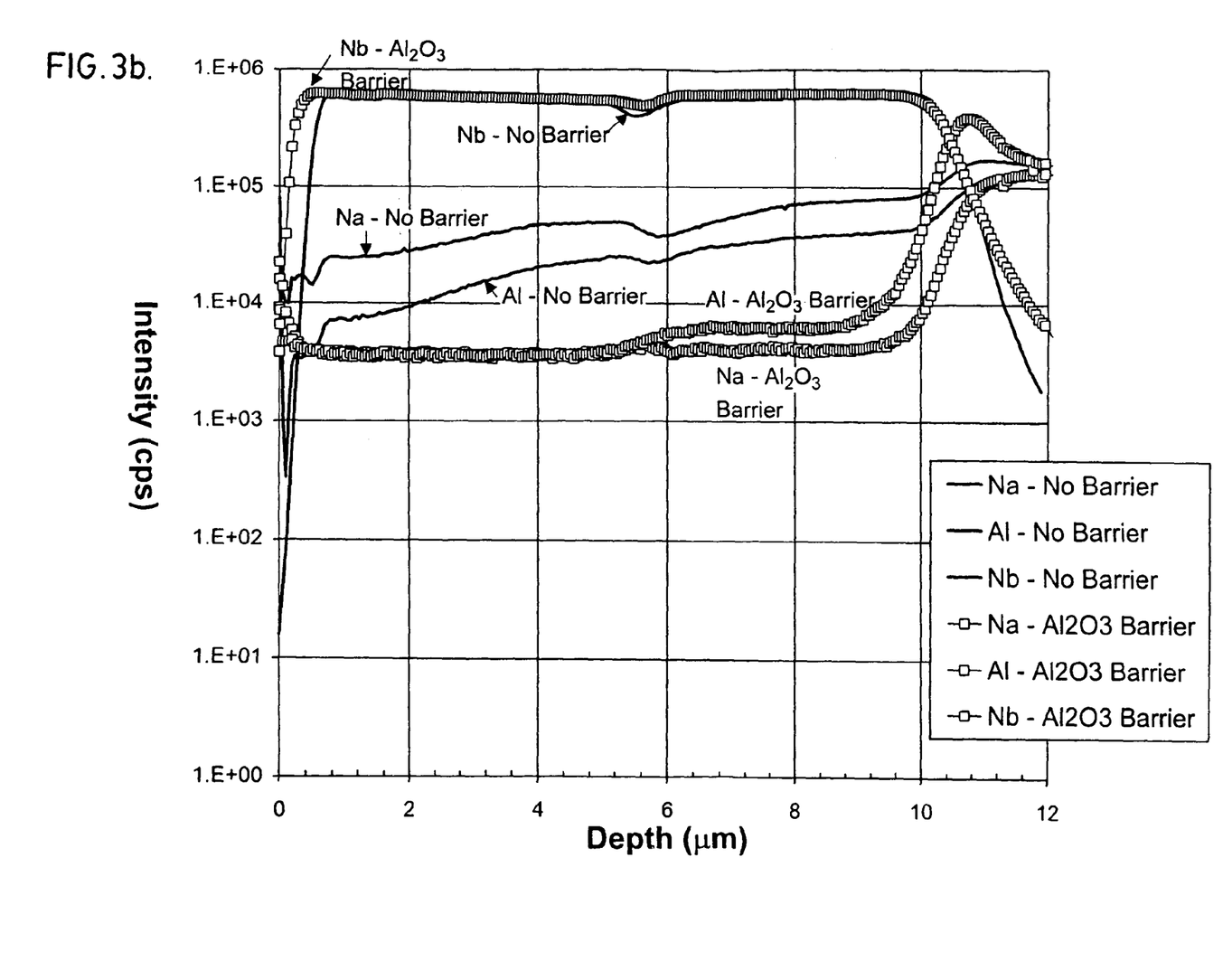
FIG. 3b is a graph showing a concentration of chemical species (Nb, Na, Al) versus depth in a composite thick film dielectric structure for thick film dielectric electroluminescent displays with and without an alumina barrier layer of the present invention.

Two thick film dielectric electroluminescent displays were fabricated, one with an alumina barrier layer and the other without an alumina barrier layer as in Examples 1 and 2, respectively, except that the barium titanate layer, the phosphor layer, the silicon nitride layer and the upper electrode were omitted. The displays were subjected to elemental profiling using SIMS (Secondary Ion Mass Spectroscopy) analysis. The concentration of silicon, aluminum, sodium and potassium as a function of distance from the top surface of the composite thick film dielectric layer is shown for each display in FIGS. 3a and 3b. As a reference, to define the boundary between the composite thick film dielectric layer and the substrate, the concentration of niobium is also shown. As can be seen from the data, the display with the alumina barrier layer shows that the concentration of sodium, potassium, aluminum and silicon is high in the glass substrate, but the concentration drops off steeply in the composite thick film dielectric layer. By contrast, for the display without the alumina barrier layer, the concentration of these elements is substantially higher throughout the thickness of the composite thick film dielectric layer. This data shows the effectiveness of the barrier layer in preventing diffusion of species from the glass into the composite thick film dielectric layer. Furthermore, the display with the alumina barrier layer showed good mechanical integrity, with no visible cracks or delamination of the layers.

Example 7

Figure 4A:
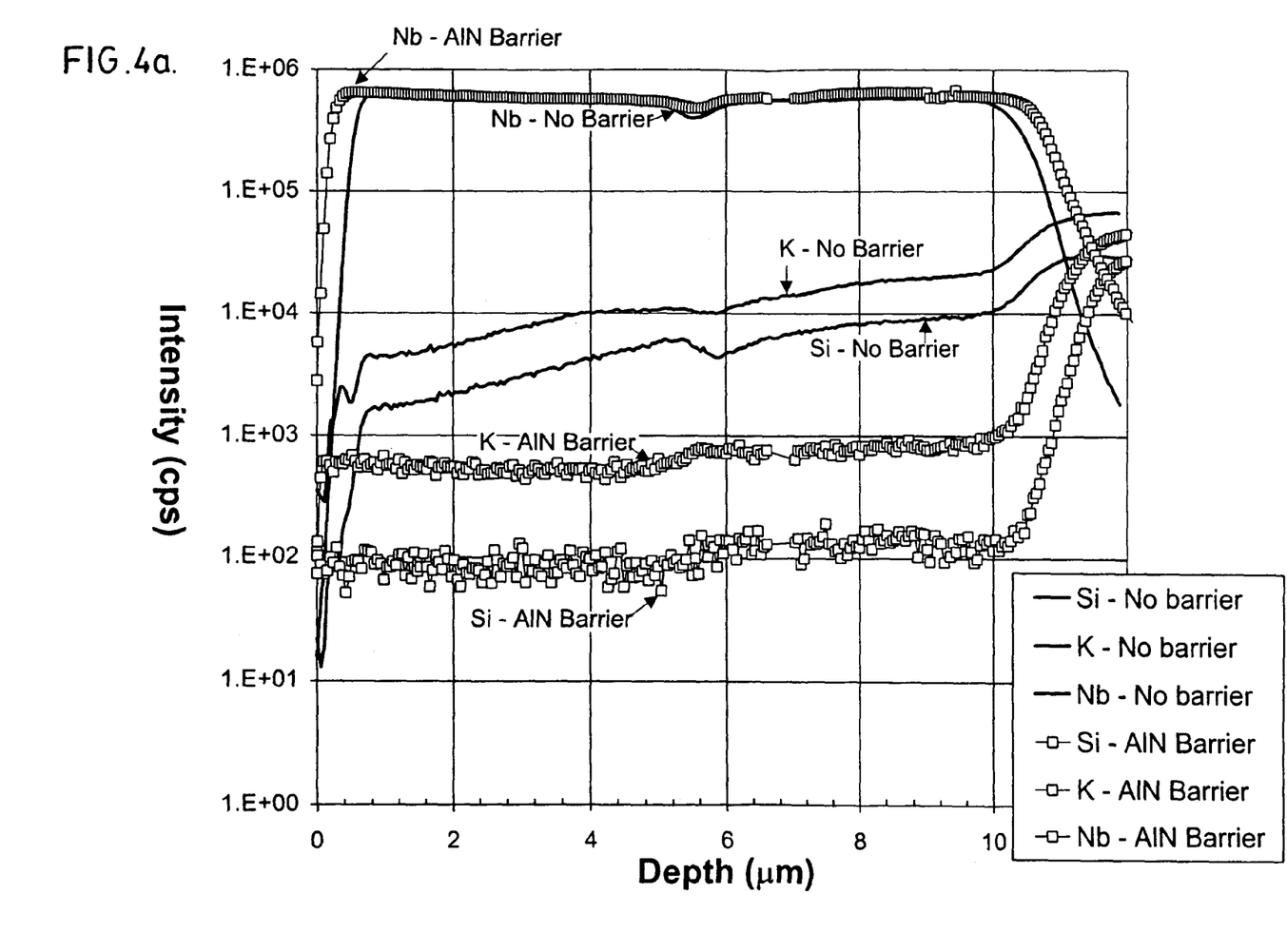
FIG. 4a is a graph showing the concentration of chemical species (Nb, Si, K) versus depth in a composite thick film dielectric structure for thick film dielectric electroluminescent displays with and without an aluminum nitride barrier layer of the present invention.
Figure 4B:
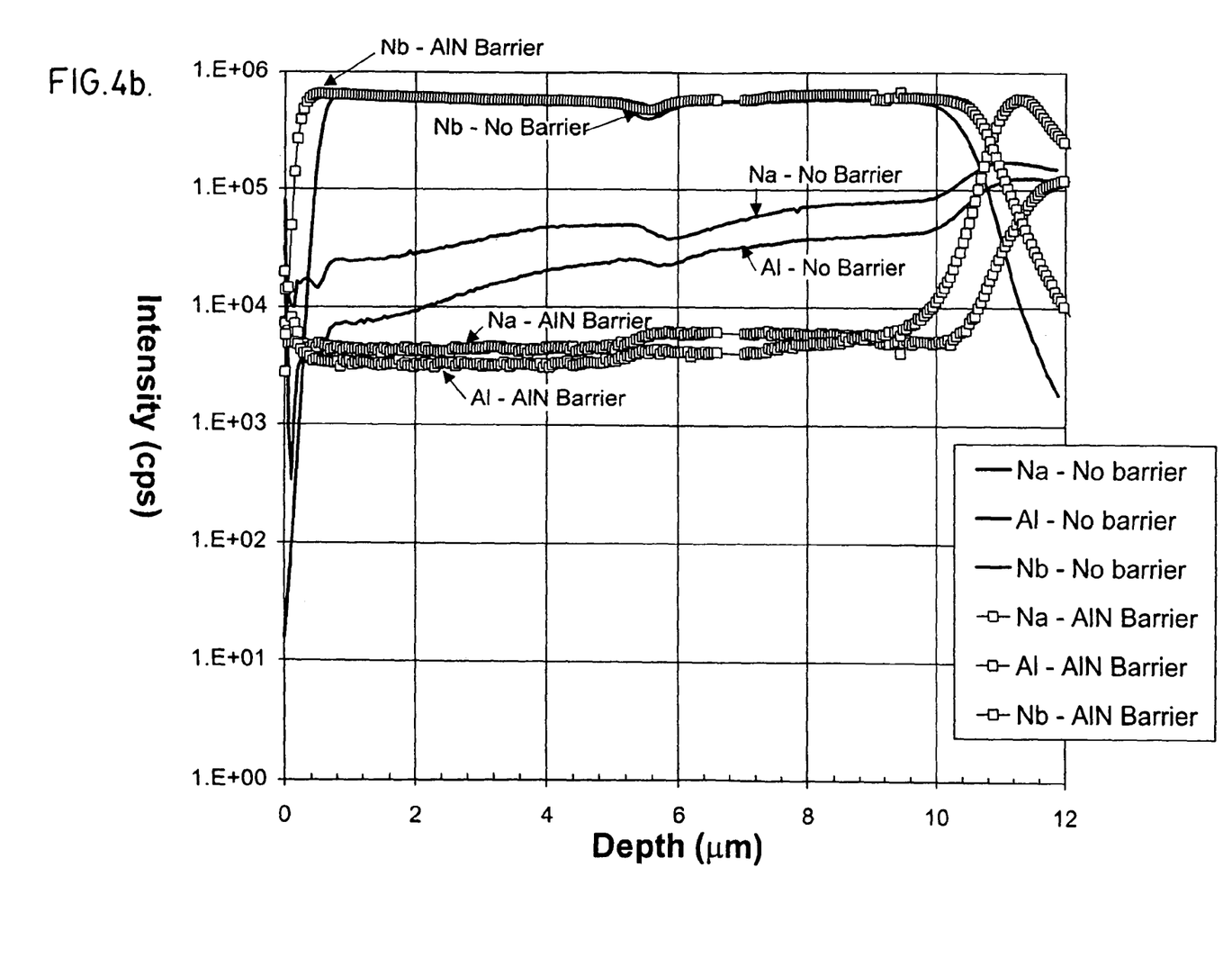
FIG. 4b is a graph showing the concentration of chemical species (Nb, Na, Al) versus depth in a composite thick film dielectric structure for thick film dielectric electroluminescent displays with and without an aluminum nitride barrier layer of the present invention.

A thick film dielectric electroluminescent display similar to Example 6 was fabricated, except that a 2000 Angstrom thick aluminum nitride barrier layer is used instead of the alumina barrier layer. The display was subjected to elemental profiling using SIMS analysis and the concentration of silicon, aluminum, sodium and potassium as a function of distance from the top surface of the composite thick film dielectric layer was measured. This data compared with the data for the display of Example 6 without a barrier layer is shown in FIGS. 4a and 4b. As can be seen from the data, the aluminum nitride barrier layer was similarly effective in preventing migration of sodium, potassium, aluminum and silicon into the composite thick film dielectric layer. However, some cracking of the aluminum nitride barrier layer was observed, suggesting that the thermal expansion coefficient of the various layers in the display were not sufficiently well matched.

Aluminum nitride may be more suitable for glasses and composite thick film dielectric layers with different thermal expansion coefficients.

Example 8

Figure 5A:
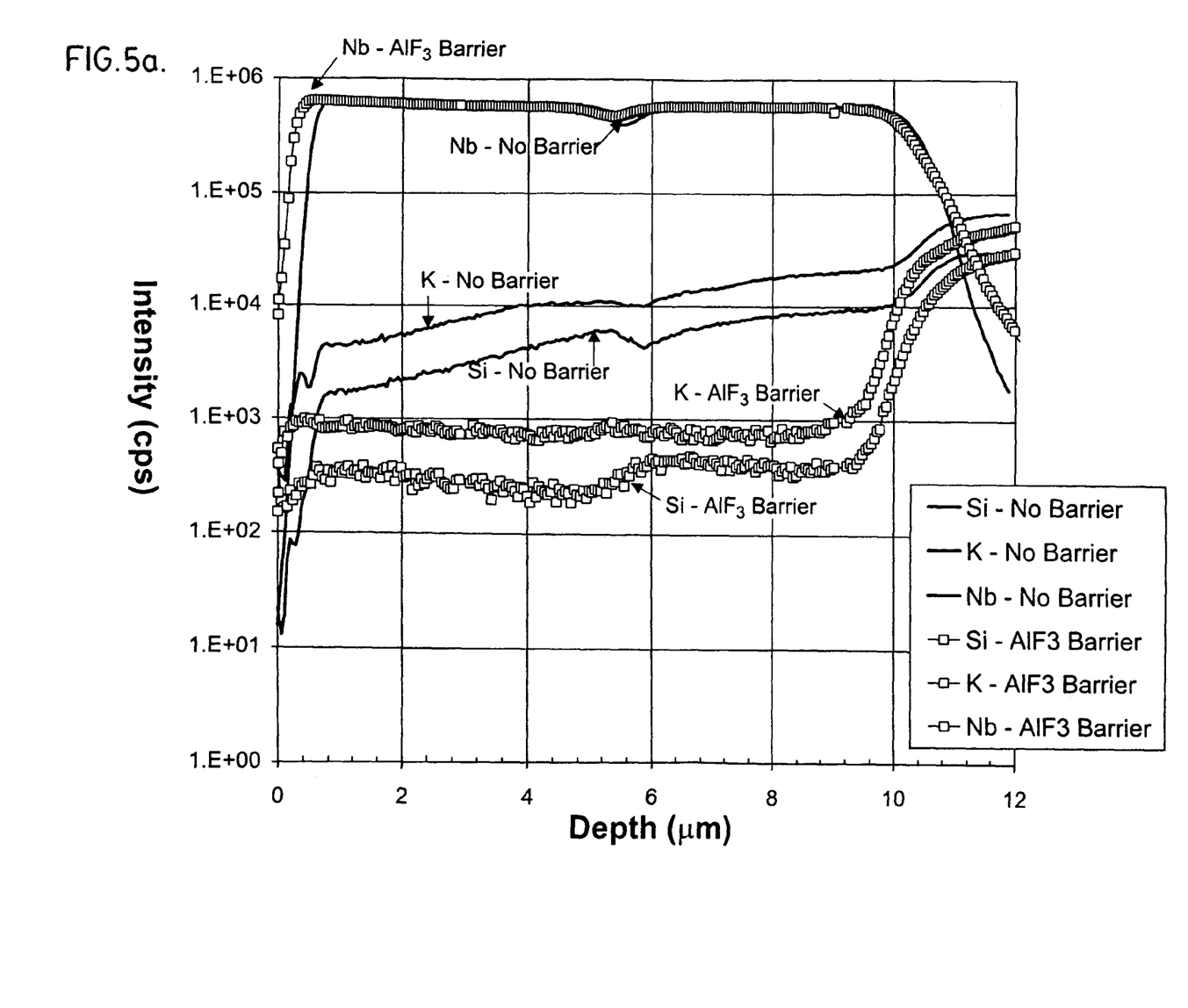
FIG. 5a is a graph showing the concentration of chemical species (Nb, Si, K) versus depth in a composite thick film dielectric structure for thick film dielectric electroluminescent displays with and without an aluminum fluoride barrier layer of the present invention.
Figure 5B:
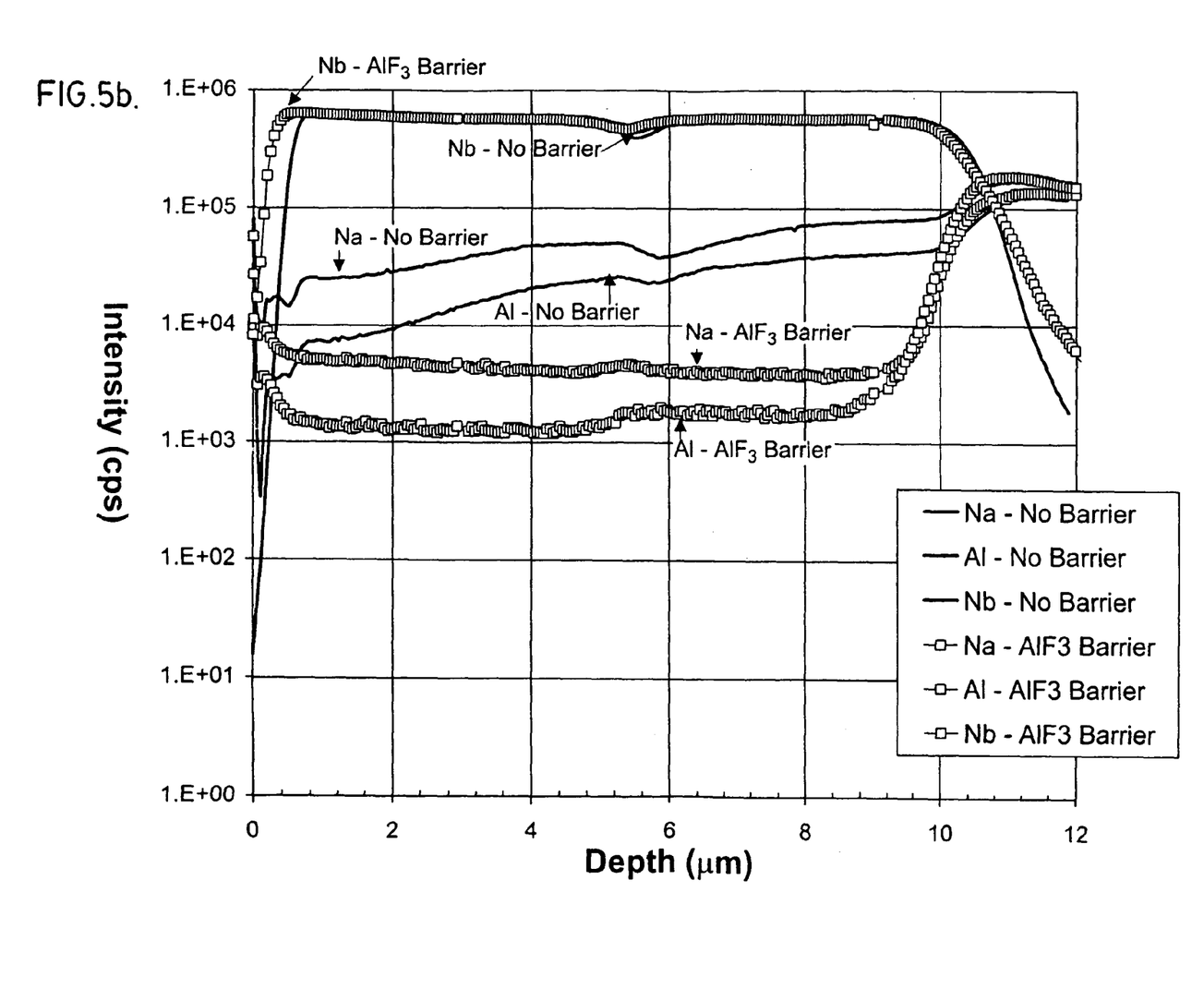
FIG. 5b is a graph showing the concentration of chemical species (Nb, Na, Al) versus depth in a composite thick film dielectric structure for thick film dielectric electroluminescent displays with and without an aluminum fluoride barrier layer of the present invention.

A thick film dielectric electroluminescent display similar to Example 6 was fabricated, except that a 2000 Angstrom thick aluminum fluoride barrier layer is used instead of the alumina barrier layer. The display was subjected to elemental profiling using SIMS analysis and the concentration of silicon, aluminum, sodium and potassium as a function of distance from the top surface of the composite thick film dielectric layer was measured. This data compared with the data for the display of Example 6 without a barrier layer is shown in FIGS. 5a and 5b. As can be seen from the data, the aluminum fluoride barrier layer was also effective in preventing migration of sodium, potassium, aluminum and silicon into the composite thick film dielectric layer. However, the aluminum fluoride layer partially delaminated from the glass substrate, suggesting that either the bonding of the aluminum fluoride to the glass was weak or the thermal expansion coefficient of the aluminum fluoride was not well matched to that of the glass. Accordingly, aluminum fluoride may also be more suitable for glasses and composite thick film dielectric layers with different thermal expansion coefficients. It is understood by one skilled in the art that the thermal expansion coefficient for the glass and the composite thick film dielectric layer can be modified according to the requirements for the application.

Example 9

Figure 6A:
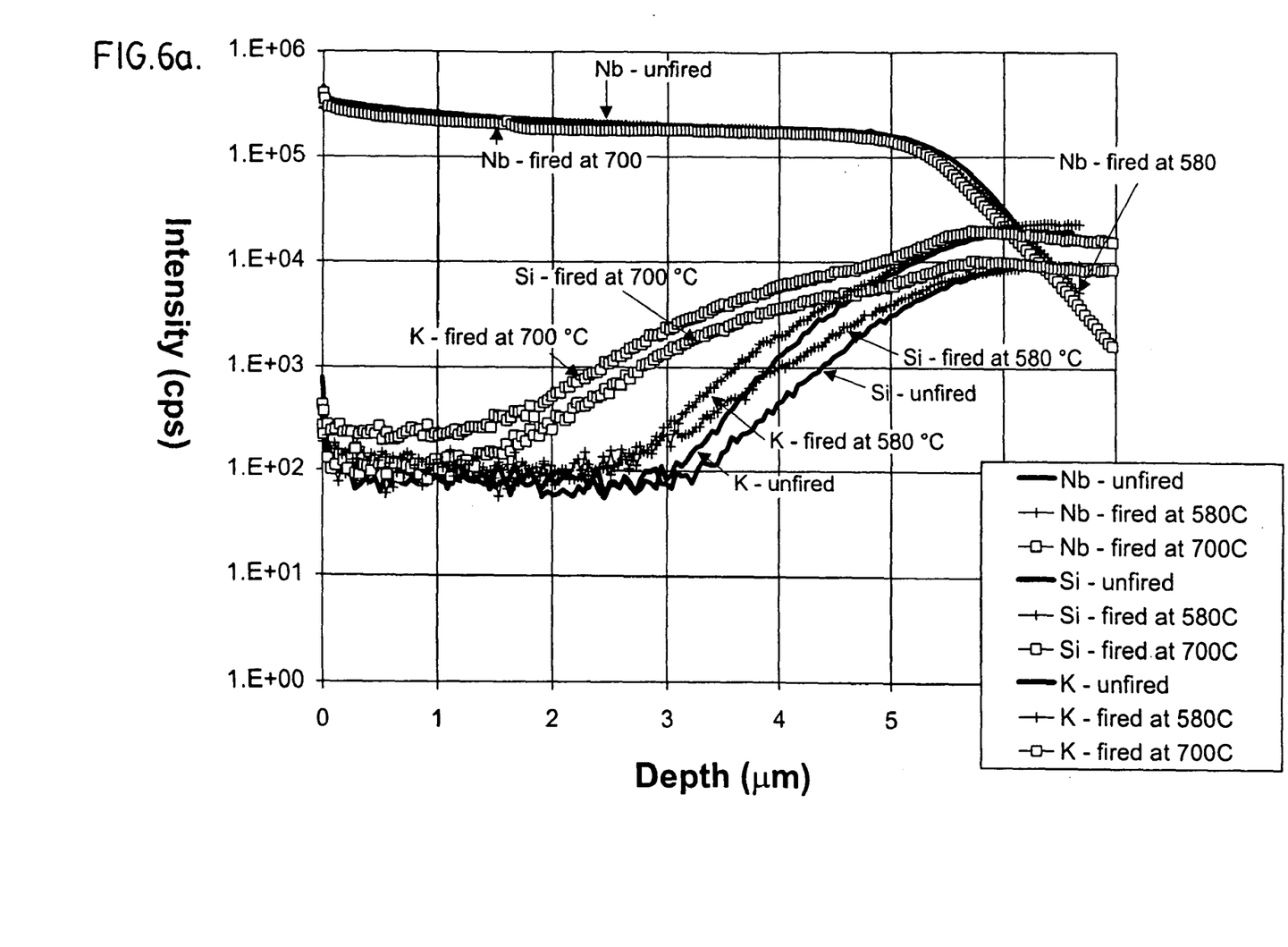
FIG. 6a is a graph showing the concentration of chemical species (Nb, Si, K) versus depth in a first thick film dielectric layer for thick film dielectric electroluminescent displays without a barrier layer of the present invention and fired at different temperatures.
Figure 6B:
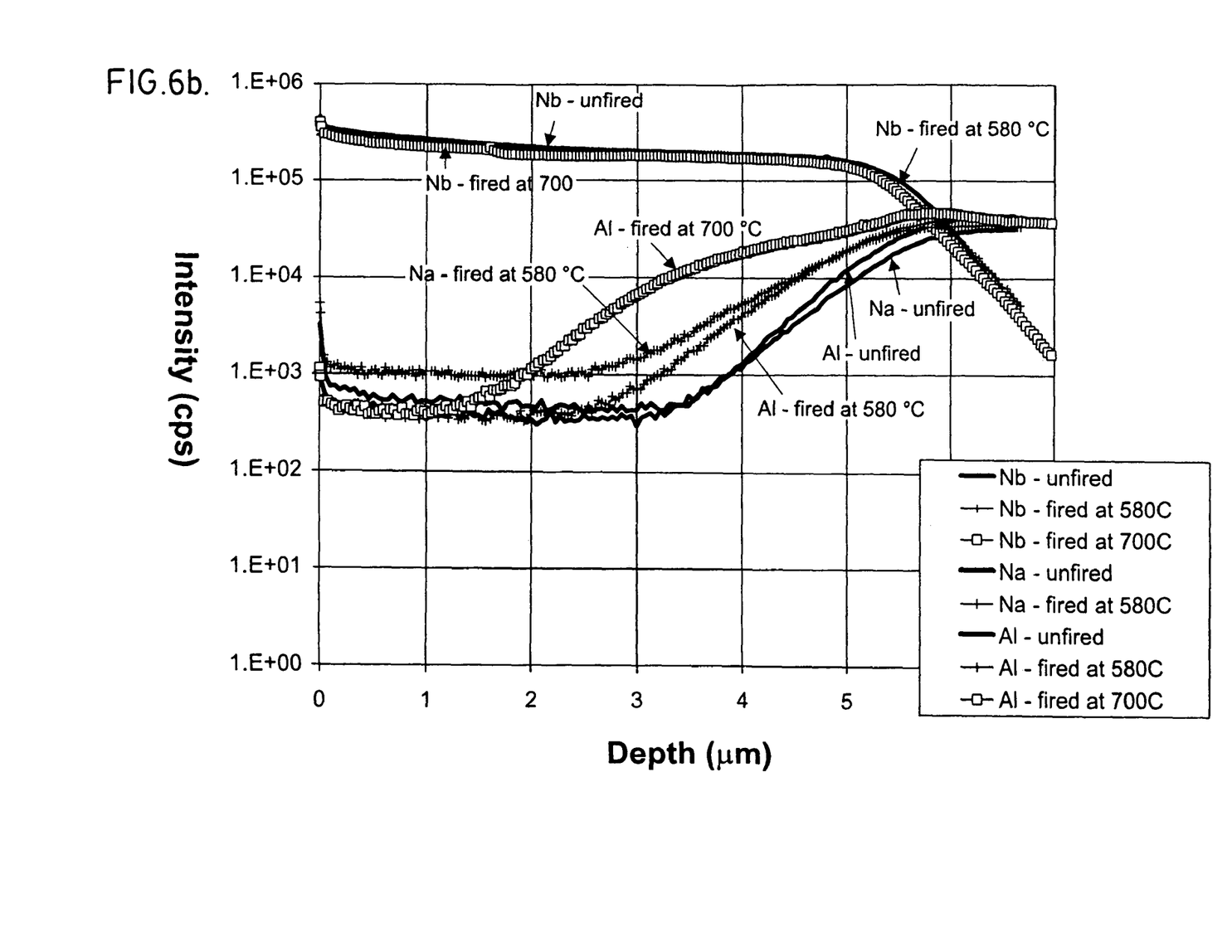
FIG. 6b is a graph showing the concentration of chemical species (Nb, Na, Al) versus depth in a first thick film dielectric layer for thick film dielectric electroluminescent displays without a barrier layer of the present invention and fired at different temperatures.

This example illustrates the extent to which the diffusion of chemical species from the glass substrate into the composite thick film dielectric layer depends on temperature. Three displays, similar to those of Example 6 without the alumina barrier layer, were fabricated, except that only the first thick film dielectric layer of the composite thick film dielectric layer was deposited and fired. One display was not fired following deposition of the first thick film dielectric layer, the second display was fired at about 580° C. following deposition of the first thick film dielectric layer and the third display was fired at about 700° C. following deposition of the first thick film dielectric layer. Each display was subject to profiling of sodium, potassium, aluminum and silicon by SIMS analysis and each are compared in FIGS. 6a and 6b. As can be seen from the data, there was no discernable diffusion of species from the lass substrate for the unfired display, some diffusion for the display fired at 580° C. and more diffusion for the display fired at 700° C.

Although preferred embodiments of the invention have been described herein in detail, it will be understood by those skilled in the art that variations may be made thereto without departing from the spirit of the invention.

The invention claimed is:

1. A sub-structure of a thick film dielectric electroluminescent display, the sub-structure comprising, in sequence:
   a substrate;
   a barrier layer;
   a lower electrode; and
   a thick film dielectric layer,
   the barrier layer being chemically inert with respect to the substrate and the lower electrode, the barrier layer inhibiting diffusion of at least one chemical species therethrough.

2. The sub-structure of claim 1 wherein the barrier layer is adjacent both the substrate and the lower electrode layer.

3. The sub-structure of claim 1 wherein the barrier layer is adhesively joined to both the substrate and the lower electrode layer.

4. The sub-structure of claim 1 wherein the barrier layer has physical properties such that internal stress is minimized during fabrication of the sub-structure and the barrier layer and other layers of the sub-structure and display remain substantially crack-free.

5. The sub-structure of claim 4 wherein the barrier layer has a thermal expansion coefficient that matches the thermal expansion coefficients of the other layers to minimize internal stress.

6. The sub-structure of claim 4 wherein the barrier layer has a thermal expansion coefficient of about $4 \times 10^{-6}/°$ C. to about $10 \times 10^{-6}/°$ C.

7. The sub-structure of claim 1 wherein the barrier layer comprises a material selected from the group consisting of alumina, aluminum nitride, aluminum fluoride, and barium titanate.

8. The sub-structure of claim 1 wherein the barrier layer has a thickness of at least about 50 nanometers.

9. The sub-structure of claim 1 wherein the barrier layer has a thickness of at least about 100 nanometers.

10. The sub-structure of claim 1 wherein the thick film dielectric layer has a relative dielectric constant greater than about 50.

11. The sub-structure of claim 1 wherein the thick film dielectric layer has a relative dielectric constant of at least about 1000.

12. The sub-structure of claim 1 wherein the thick film dielectric layer is a composite thick film dielectric layer.

13. A thick film dielectric electroluminescent display comprising the sub-structure of claim 12.

14. The sub-structure of claim 1 further comprises, in sequence, a smoothing layer adjacent the thick film dielectric layer.

15. The sub-structure of claim 1 wherein the at least one chemical species is selected from the group consisting of alkali metals and alkaline earth metals.

16. The sub-structure of claim 1 wherein the substrate is a glass substrate that comprises elements selected from the group consisting of Group IA (alkali metals), Group IIA (alkaline earth metals), silicon and aluminum.

17. The sub-structure of claim 1 wherein the substrate is selected from the group consisting of, ceramics, metal ceramic composites, glass materials, and glass ceramic materials.

18. The sub-structure of claim 1 wherein the substrate is a glass substrate comprising at least one chemical species selected from the group consisting of silica, alumina, alkali metal oxides, alkaline earth oxides and mixtures thereof.

19. The sub-structure of claim 1, wherein an other barrier layer is interposed between the lower electrode and the thick film dielectric layer and the other barrier layer is chemically inert with respect to the lower electrode and the thick film dielectric layer and inhibits diffusion of at least one chemical species therethrough.

20. The sub-structure of claim 19 wherein the other barrier layer is selected from the group consisting of a layer of a material having a relative dielectric constant greater than about 50 and a layer of material having a lower relative dielectric constant and a thickness of at most about 50 nm.

21. The sub-structure of claim 19 wherein the other barrier layer comprises crystalline barium titanate.

22. The sub-structure of claim 19 wherein the other barrier layer has a thickness of at most about 50 nm and comprises a material selected from the group consisting of alumina, aluminum nitride, aluminum fluoride and barium titanate.

23. The sub-structure of claim 22 wherein the other barrier layer has a thickness of about 20 nm to about 50 nm.

24. A thick film dielectric electroluminescent display comprising the sub-structure of claim 1.

25. A sub-structure of a thick film dielectric electroluminescent display, the sub-structure comprising, in sequence:
   a substrate;
   a lower electrode;
   a barrier layer; and
   a thick film dielectric layer,
   the barrier layer being chemically inert with respect to the lower electrode and the thick film dielectric layer, the barrier layer inhibiting diffusion of at least one chemical species therethrough.

26. The sub-structure of claim 25 wherein the barrier layer is selected from the group consisting of a layer of a material having a relative dielectric constant greater than about 50 and a layer of material having a lower relative dielectric constant and a thickness of at most about 50 nm.

27. The sub-structure of claim 25 wherein the barrier layer comprises crystalline barium titanate.

28. The sub-structure of claim 25 wherein the barrier layer has a thickness of at most about 50 nm and comprises a material selected from the group consisting of alumina, aluminum nitride, aluminum fluoride and barium titanate.

29. The sub-structure of claim 28 wherein the barrier layer has a thickness of about 20 nm to about 50 nm.

30. The sub-structure of claim 25 wherein the thick film dielectric layer is a composite thick film dielectric layer.

31. A method for making a sub-structure for use in a thick film dielectric electroluminescent display, the method comprising;
   i) depositing a barrier layer onto a substrate;
   ii) depositing a lower electrode onto the barrier layer; and
   iii) depositing a thick film dielectric layer onto the lower electrode, the barrier layer being chemically inert with respect to the substrate and the lower electrode, the barrier layer inhibiting diffusion of at least one chemical species therethrough.

32. The method of claim 31 wherein the barrier layer has physical properties such that internal stress is minimized during fabrication of the sub-structure and the barrier layer and other layers of the sub-structure and display remain substantially crack-free.

33. The method of claim 31 wherein the thick film dielectric layer is a composite thick film dielectric layer.

34. A method for making a sub-structure for use in a thick film dielectric electroluminescent display, the method comprising;
   i) depositing a lower electrode onto a substrate;
   ii) depositing a barrier layer onto the lower electrode; and
   iii) depositing a thick film dielectric layer onto the lower electrode, the barrier layer being chemically inert with respect to the lower electrode and the thick film dielectric layer, the barrier layer inhibiting diffusion of at least one chemical species therethrough.

35. The method of claim 34 wherein the barrier layer has physical properties such that internal stress is minimized during fabrication of the sub-structure and the barrier layer and other layers of the sub-structure and display remain substantially crack-free.

36. The method of claim 34 wherein the thick film dielectric layer is a composite thick film dielectric layer.

37. The method of any one of claim 34 wherein the barrier layer is selected from the group consisting of a layer of a material having a relative dielectric constant greater than about 50 and a layer of material having a lower relative dielectric constant and a thickness of at most about 50 nm.

38. The method of any one of claim 34 wherein the barrier layer comprises crystalline barium titanate.

39. The method of any one of claim 34 wherein the barrier layer has a thickness of at most about 50 nm and comprises a material selected from the group consisting of alumina, aluminum nitride, aluminum fluoride and barium titanate.

40. The method of claim 39 wherein the barrier layer has a thickness of about 20 nm to about 50 nm.

41. A sub-structure of a thick film dielectric electroluminescent display, the sub-structure comprising a barrier layer between a substrate and a thick film dielectric layer, the barrier layer being chemically inert with respect to the substrate and the thick film dielectric layer, the barrier layer inhibiting diffusion of at least one chemical species therethrough.

42. A sub-structure of claim 41 wherein the barrier layer has physical properties such that internal stress is minimized during fabrication of the sub-structure and the barrier layer and other layers of the sub-structure and display remain substantially crack-free.

43. A sub-structure of claim 41 wherein the thick film dielectric layer is a composite thick film dielectric layer.

44. A sub-structure of a thick film dielectric electroluminescent display, the sub-structure comprising, in sequence:
   a substrate;
   a barrier layer inhibiting diffusion of at least one chemical species therethrough;
   a lower electrode; and
   a composite thick film dielectric layer,
   the barrier layer being chemically inert with respect to the substrate and the lower electrode, the barrier layer having physical properties such that internal stress is minimized during fabrication of the sub-structure and the barrier layer and other layers of the sub-structure and display remain substantially crack-free.

* * * * *